Figure 1:
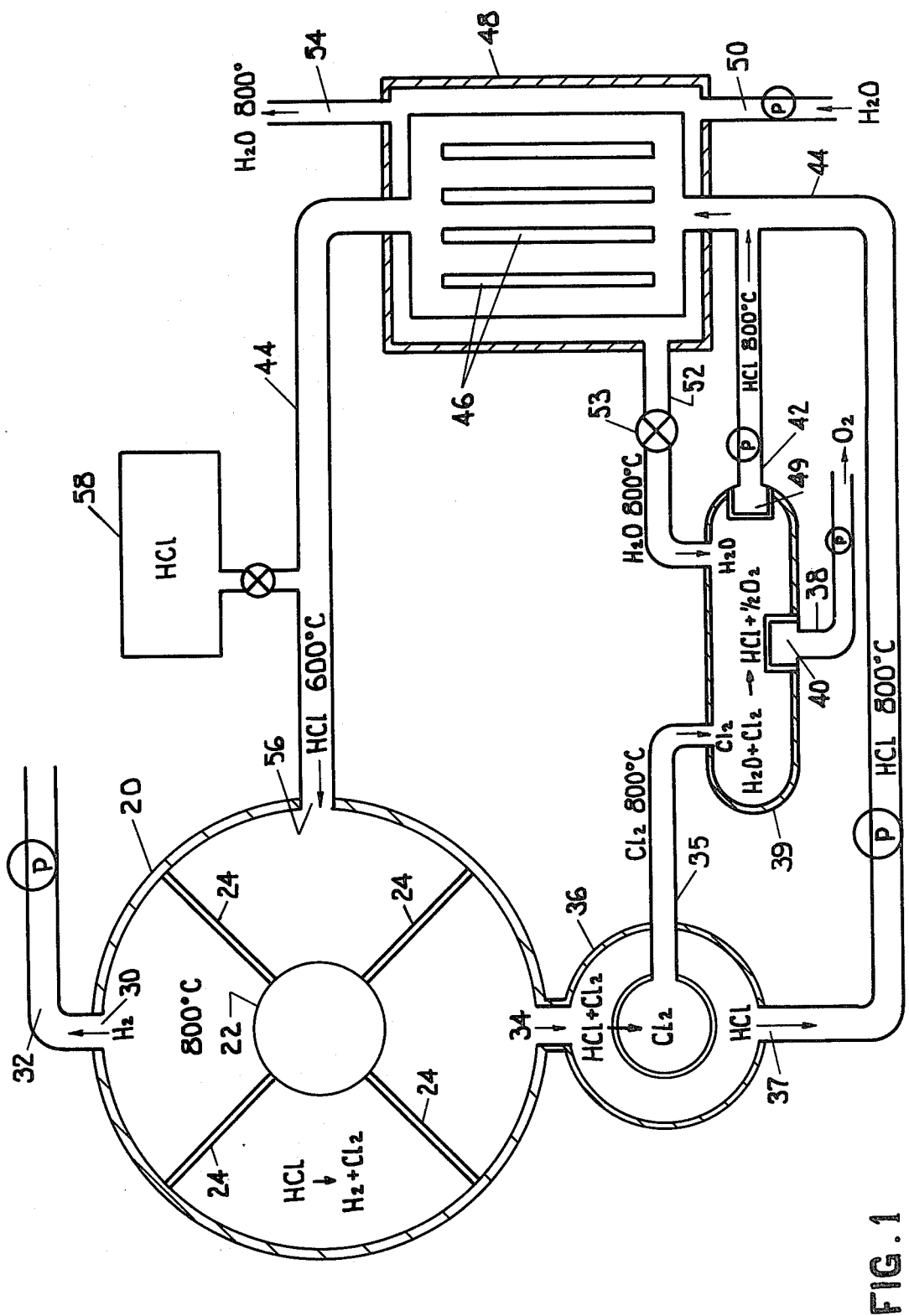

United States Patent [19]
Gomberg

[11] 4,097,348
[45] Jun. 27, 1978

[54] METHOD AND APPARATUS FOR PRODUCING HYDROGEN

[75] Inventor: Henry J. Gomberg, Ann Arbor, Mich.

[73] Assignee: Texas Gas Transmission Corporation, Owensboro, Ky.

[21] Appl. No.: 675,136

[22] Filed: Apr. 8, 1976

Related U.S. Application Data

[63] Continuation of Ser. No. 479,025, Jun. 7, 1974, abandoned.

[51] Int. Cl.$^2$ ............................................... B01J 1/10
[52] U.S. Cl. ............................. 204/157.1 H; 250/527
[58] Field of Search ................ 204/157.1 H; 250/527; 176/39

[56] References Cited
U.S. PATENT DOCUMENTS 3,294,643 12/1966 Guernsey ...................... 204/157.1 H

FOREIGN PATENT DOCUMENTS 908,469 10/1962 United Kingdom ................... 176/39

*Primary Examiner*—Howard S. Williams
*Attorney, Agent, or Firm*—Laurence R. Brown

[57] ABSTRACT

A method and apparatus for producing hydrogen for use as an ingredient as hydrogen-based fuels which comprises introducing a quantity of gaseous HCl and subjecting said gas to the heat and radiation of a fusion reaction to dissociate into $H_2$ and $Cl_2$. This is followed by a separation of the gases including the removal of the hydrogen and the introduction of the hot $Cl_2$ into a chamber with water to create additional HCl which is recycled in a subsequent fusion reaction cycle. The method includes the utilization of the heat from the extracted gases as a source for heating the make-up water for the system and also as a source of energy to make steam or for use in any system where heat is a desirable source of energy.

12 Claims, 2 Drawing Figures

METHOD AND APPARATUS FOR PRODUCING HYDROGEN

This is a continuation of application Ser. No. 479,025, filed June 7, 1974, now abandoned.

This invention relates to the Method and Apparatus for Producing Hydrogen and more particularly to the production of hydrogen utilizing the heat and radiation of a fusion reaction. While other sources of heat and radiation can be utilized, the method and apparatus to be disclosed are particularly adapted to a fusion reactor.

Reference is made to a copending application of Henry J. Gomberg entitled "Multi-Step Chemical and Radiation Process for the Production of Gas," Ser. No. 417,000, filed Nov. 19, 1973, in which the basic process is discussed.

It is an object of the present invention to provide an improved method and apparatus for achieving the production of hydrogen starting with gaseous HCl. It is a further object to provide a system which requires only the addition of water, the chlorine being recycled. It is a further object to utilize the heat of the system to heat the incoming water so that a portion can be re-introduced into the system while a greater portion can be used for a heat source. At the same time, the water cools the gaseous hydrochloric acid in the recirculation area to ready the gas for re-introduction into the system.

Other objects and features of the invention will be apparent in the following description and claims in which there is set forth the principles of operation of the method and apparatus and the best mode presently contemplated for the practice of the invention.

Figure 2:
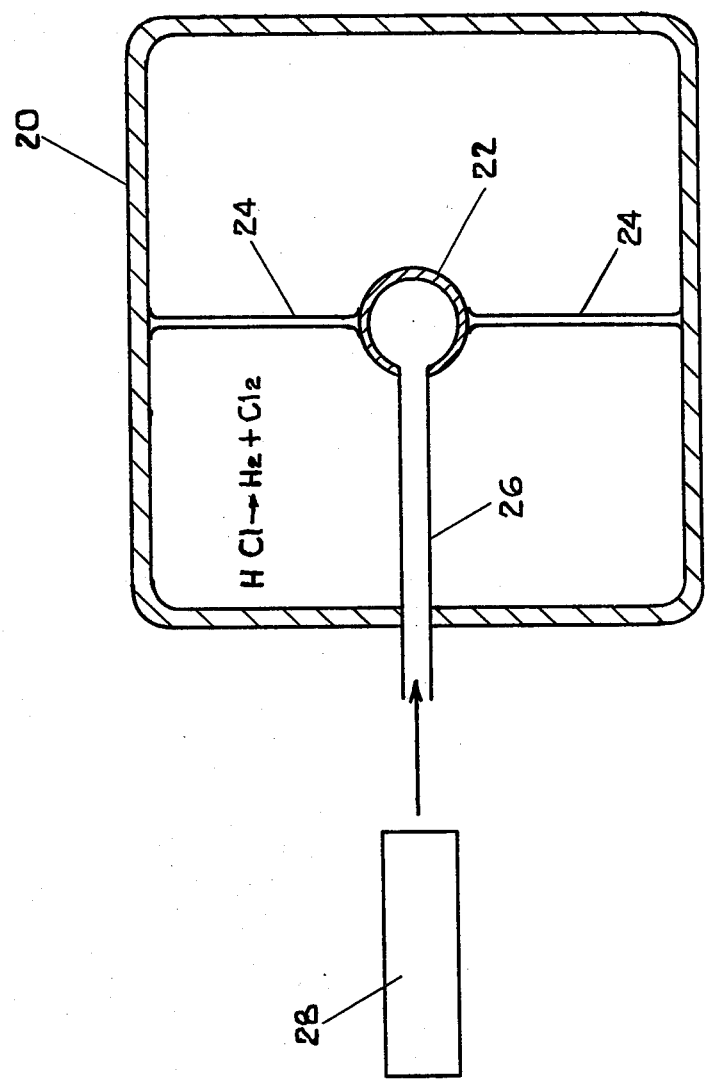

Drawings accompany the invention and the various views thereof may be briefly described as:

FIG. 1, a sectional view of an apparatus with diagrammatic portions to show the cycling of the system; and FIG. 2, a sectional view of the main vessel of the apparatus.

The basic reaction in the process to be described is as follows:

2 HCl + heat + radiation → H$_2$ + Cl$_2$

In the above-referenced application, the dissociation was accomplished in two steps as follows:

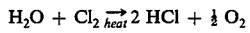
H$_2$O + Cl$_2$ $\underset{heat}{\rightleftarrows}$ 2 HCl + ½ O$_2$

2 HCl + radiation → H$_2$ + Cl$_2$

In the present invention an apparatus is provided in which the heat and radiation of a fusion reaction can be utilized simultaneously to accomplish the desired dissociation.

In FIG. 1, a containment chamber 20 is formed of a material which will provide a thermal and radiation shield around a fusion reactor chamber 22. The reactor chamber can be constructed as described in the following U.S. Pat. Nos.:

3,378,446 — Whittlesey — 4/16/68
3,489,645 — Daiber — 1/13/70
3,624,239 — Fraas — 11/30/71
3,762,992 — Hedstrom — 10/02/73

The reactor chamber is supported in the containment chamber by a plurality of rods 24 formed of refractory material or by other heat and radiation resistant supports. A laser tube 26 (FIG. 2) projects into the chamber 20 for access to the reaction chamber and a laser 28 is provided having a prescribed output to achieve fusion in the fusion chamber.

At the top of chamber 20 is an outlet 30 leading to a pipe 32 for hydrogen (H$_2$) which by reason of its inherent specific gravity will rise to the top of the chamber. A suitable pump can be utilized to remove the H$_2$. Other means of separating H$_2$, if desired, are shown in U.S. Pat. Nos. to Betteridge 3,406,496 (1968) and Collins 3,660,967 (1972). At the bottom of the chamber 20 is an outlet 34 leading to a secondary separation chamber 36 from which HCl and Cl$_2$ move separately through outlets 35 and 37. The chlorine moves to reaction vessel 39 from which oxygen is removed and in which a fresh supply of water (from passage 52) is mixed with chlorine to re-establish gaseous hydrochloric acid. An outlet passage 38 is provided for oxygen and a suitable separation system 40 is provided to filter the oxygen from the chlorine. A material such as titanium dioxide may be utilized for this purpose. A process of separating oxygen from gaseous mixtures is described in detail in a U.S. Pat. No. to Merriman 3,762,033 (1973). See also Ellison, U.S. Pat. No. 3,593,495 (1971).

Another outlet 42 is provided leading to conduit 44 which carries the hot HCl gas from 37 and which passes through a heat exchanger 46 jacketed by a water chamber 48 which receives cold water through an inlet 50. This chamber 48 delivers make-up water (steam) to secondary chamber 39 through a conduit 52, valved at 53, and delivers heated water (steam) to an outlet conduit 54 from which it can be delivered to any system for utilizing heat, as for example, steam engines, heating plants and the like.

The conduit 44, carrying hot HCl, after passing through the heat exchanger 48, discharges into the main containment chamber 20 at opening 56. A starting or makeup supply of HCl is provided in tank 58 for suitable valving into conduit 44.

In the operation of the system, an initial charge of gaseous hydrochloric acid at about 600° C is introduced through opening 56 into chamber 20. A fusion reaction is initiated in chamber 22 by the firing of the laser 28 with a suitable quantity of fusion fuel. This will release heat and radiation energy into the chamber 20 and react on the HCl contained therein. A temperature of at least 800° C will be reached while some of the HCl undergoes radiolytic dissociation into H$_2$ and Cl$_2$:

2 HCl $\xrightarrow{radiation}$ H$_2$ + Cl$_2$

The rate of hydrogen production is dependent on the mass of gas in the chamber 20 at the time of the fusion reaction and this is independent of the rate of gas flow through the system.

The hydrogen will rise to the top of the chamber 20 where it will be pulled out of opening 30. The chlorine and HCl will move to the lower opening 34 and into separation chamber 36. The chlorine and hydrogen can be separated by known processes as referenced above. Suitable pumps can be utilized where necessary to move the gases. It is preferred that any non-dissociated HCl be separated from the Cl$_2$ in separator 36. Such separation is disclosed in U.S. Pat. No. 3,488,923 to Hutchinson, patented Jan. 13, 1970. In chamber 39, the chlorine gas resulting from the reaction will collect.

The chlorine will react with H₂O entering through conduit 52 to form HCl in the reaction:

$$H_2O + Cl_2 \xrightarrow{heat} 2 HCl + \tfrac{1}{2} O_2$$

The residual and freshly made gaseous HCl will then move through conduit 42 to join the heated circulating HCl in conduit 44. The combined HCl streams move to the heat exchanger 46–48 where it will be cooled by the water in jacket 48. If desired, a separator 49 at the entrance to conduit 42 can be used to remove other gases from the HCl. At the same time the water will be heated to around 800° C and a portion of this water in the form of steam will be introduced through valved conduit 52 to the secondary reaction chamber 36. The remainder of the water being fed at 50 to heat exchanger 48 can be led through outlet pipe 54 to any suitable steam utilizing system. The heat exchange rate using the HCl as the medium is independent of the hydrogen production and primarily dependent on the rate of flow of the non-dissociated HCl gas. This flow rate can be regulated by the pumping system.

The size of the containment chamber relative to the fusion reactor chamber can be readily related to the neutron absorption length and have a minimum radius consistent therewith. The various inlets and outlets in chamber 20 can be suitably shielded to avoid radiation loss and leakage.

I claim:

1. A method of producing hydrogen for use as an ingredient of hydrogen based fuels which comprises:
   (a) introducing a quantity of gaseous HCl into a first chamber;
   (b) subjecting such quantity simultaneously to heat and radiation to dissociate the HCl into H₂ and Cl₂;
   (c) separating the gases by removing the H₂ and introducing the hot Cl₂ into a secondary chamber;
   (d) introducing H₂O at about 800° C into said secondary chamber to form HCl; and
   (e) transferring said HCl to said first chamber and initiating a second and subsequent similar cycles.

2. A method as defined in claim 1 in which the HCl from said secondary chamber is passed through a heat exchanger while moving back into the first chamber, passing a quantity of water to said heat exchanger to heat it to about 800° C and transferring such heated water to said secondary chamber.

3. A method as defined in claim 2 in which water is introduced into said heat exchanger in excess of the quantity needed for reconstituting the HCl and utilizing the heat of the HCl egressing from said secondary chamber to heat said water while cooling said HCl; and utilizing the steam resulting from said heating for utilitarian purposes.

4. A method as defined in claim 1 in which oxygen is separated from Cl₂ and HCl and removed from said secondary chamber.

5. A method as defined in claim 1 wherein the heat and radiation of step (b) is derived from a laser ignited fusion reaction.

6. An apparatus for forming hydrogen for use in hydrogen-based fuels and the like which comprises:
   (a) a first chamber having an inlet for HCl, an outlet for H and an outlet for Cl₂;
   (b) a fusion reactor chamber;
   (c) means to support said reactor chamber in said first chamber;
   (d) a laser;
   (e) means to introduce a beam from said laser into said reactor chamber;
   (f) a secondary chamber connected to said outlet from said first chamber and having an outlet for HCl leading to said first chamber; and
   (g) means for introducing H₂O at about 800° C into said secondary chamber to react with Cl₂ in said chamber to form HCl.

7. Apparatus as defined in claim 6 including means using heat energy derived from said reactor chamber from a fusion reaction to heat said water to said temperature.

8. Apparatus as defined in claim 7 including means supplying more water than used to form said reaction with Cl₂ to thereby create a source of H₂O at high temperatures as source of heat energy.

9. A method of producing hydrogen and a heat source of energy which comprises:
   (a) introducing a quantity of gaseous HCl into a first chamber;
   (b) subjecting such quantity simultaneously to heat and radiation to dissociate a portion of the HCl into H₂ and Cl₂ and to heat the remainder of the HCl to a high temperature;
   (c) separating the H₂ and Cl₂ and introducing the Cl₂ into a secondary chamber;
   (d) recirculating the non-dissociated HCl as a heat transfer medium and energy source;
   (e) introducing H₂O at about 800° C into said secondary chamber to form HCl; and
   (f) transferring said HCl to said first chamber and initiating a second and subsequent similar cycles.

10. An apparatus for extracting and utilizing heat from a fusion reaction which comprises:
    (a) a first chamber having an inlet for gaseous HCl, an outlet for H₂ and an outlet for Cl₂ and non-dissociated HCl;
    (b) a fusion reactor chamber;
    (c) means to support said reactor chamber in a position wherein the interior of said first chamber will be exposed to radiation from said reactor chamber;
    (d) a laser;
    (e) means to introduce a beam from said laser into said reactor chamber to effect a fusion reaction;
    (f) a secondary separation chamber connected to said outlet from said first chamber to receive non-dissociated HCl and Cl₂ from said first chamber;
    (g) a third chamber to receive Cl₂ from said secondary chamber;
    (h) means to introduce H₂O at about 800° C to said third chamber to react with Cl₂ to form HCl; and
    (i) means to convey HCl from said secondary chamber and said third chamber to a heat exchanger to permit absorption of a portion of the heat of said HCl and to convey said HCl to said first chamber.

11. An apparatus as defined in claim 10 in which said heat exchanger is utilized to heat water for introduction into said third chamber.

12. An apparatus as defined in claim 10 in which said heat exchanger is utilized to convert water into steam for power and heating usages.

* * * * *